United States Patent
Milla et al.

(10) Patent No.: US 6,497,912 B2
(45) Date of Patent: Dec. 24, 2002

(54) SYSTEM AND METHOD FOR CONTROLLING THE BRIX OF A CONCENTRATED JUICE PRODUCT

(75) Inventors: Jose D. Milla, Lakeland, FL (US); Keith Bunce, Lakeland, FL (US); Michael Mas, Lakeland, FL (US)

(73) Assignee: FMC Technologies, Inc., Chicago, IL (US)

( * ) Notice: Subject to any disclaimer, the term of this patent is extended or adjusted under 35 U.S.C. 154(b) by 101 days.

(21) Appl. No.: 09/727,142

(22) Filed: Nov. 30, 2000

(65) Prior Publication Data

US 2002/0064583 A1 May 30, 2002

(51) Int. Cl.[7] .................................................. A23L 2/02
(52) U.S. Cl. ........................ 426/492; 426/231; 426/590; 426/599
(58) Field of Search ................................ 426/492, 231, 426/599, 590

(56) References Cited

U.S. PATENT DOCUMENTS

| | | | |
|---|---|---|---|
| 3,391,009 A | 7/1968 | Fehlberg et al. | 99/205 |
| 3,917,867 A | 11/1975 | Atkins et al. | 426/492 |
| 4,551,348 A | 11/1985 | O'Mahony et al. | 426/639 |
| 4,599,239 A | 7/1986 | Wieland et al. | 426/590 |
| 4,626,434 A | 12/1986 | O'Mahony et al. | 426/50 |
| 4,818,555 A | 4/1989 | Piotrowski et al. | 426/599 |
| 4,946,702 A | 8/1990 | Stipp et al. | 426/599 |
| 4,971,811 A | 11/1990 | Strobel et al. | 426/50 |
| 4,973,485 A | 11/1990 | Rich | 426/534 |
| 5,206,047 A * | 4/1993 | Crandall et al. | 426/599 |
| 6,110,214 A * | 8/2000 | Klimasauskas | 703/2 |
| 6,278,962 B1 * | 8/2001 | Klimasauskas et al. | 703/13 |
| 6,212,416 B1 * | 4/2002 | Ward et al. | 600/345 |

FOREIGN PATENT DOCUMENTS

| | | | |
|---|---|---|---|
| EP | 0 292 048 | 5/1988 | A23L/2/00 |
| WO | WO 94/18854 | 9/1994 | A23L/2/02 |

* cited by examiner

Primary Examiner—Helen Pratt
(74) Attorney, Agent, or Firm—Allen, Dyer, Doppelt, Milbrath & Gilchrist, P.A.

(57) ABSTRACT

A system and method of the present invention controls the Brix of a concentrated juice product. The results of a process change in disturbance variables on the vapor temperature in at least one of the effects of the multi-stage, multi-effect evaporator are predicted and the Brix of the concentrated juice product discharged from the evaporator is controlled based on the predicted results by controlling one of steam or juice fed into the evaporator.

16 Claims, 2 Drawing Sheets

SYSTEM AND METHOD FOR CONTROLLING THE BRIX OF A CONCENTRATED JUICE PRODUCT

FIELD OF THE INVENTION

This invention relates to the processing of fruit and vegetable juices, and more particularly, this invention relates to controlling the Brix of a concentrated juice product discharged from an evaporator.

BACKGROUND OF THE INVENTION

For many years, the TASTE (thermally accelerated short-time evaporation) evaporator has provided a preheating cycle and first evaporation stage in the efficient processing of juice into a juice concentrate. This process can include pasteurization and juice stabilization. In a multi-stage, multieffect evaporator, steam is typically used on a first effect. Each subsequent effect is heated by the vapor evaporated in the preceding stage. Vapor starts at the highest pressure and ends at the stage having the lowest pressure. Any vessel where steam is flowing is known as the effect, and the area where juice flows is the stage. Evaporation takes place in one or more stages following the feed stage and the first effect, as is well known.

It is desirable if the variability of the final juice product concentration discharged from the TASTE evaporator is minimized. Accurate control over this process, however, is difficult, because of the long dead time in the process, and the constantly changing disturbance variables and coupled variables, e.g., two supposedly independent variables that are related to each other, such as (1) change in the feed Brix, and (2) an affect on the temperature.

This process dead time is difficult to overcome because in traditional feedback control methods, a change can be made only after an error is detected. If the process dead time is long, then the error can progress over an extended period of time before a correcting change is recognized. Many factors outside the immediate process can affect the evaporator control, including variations in the feed Brix, changes in steam pressure and quality from the boiler, weather conditions, and the condition of the evaporator. Because TASTE evaporators are arranged in a cross flow configuration, coupling of certain variables occur. A change in vapor pressure on the shell side of the evaporator will cause changes in juice concentration in the intermediate stages of the evaporator. Consequently, changes in feed juice concentration will cause changes in the evaporator shell-side vapor temperatures that can affect juice concentration in other stages of the evaporator before the actual feed concentration change propagates through the stages of the evaporator.

Traditional methods of TASTE evaporator control involve measuring the final product juice concentration and then adjusting the feed juice flow rate to maintain the product concentration at a desired level. This method can be accomplished either manually or automatically. In the manual method, an operator measures the final product Brix for the juice concentration, and then makes adjustments to the feed flow rate. This type of control can also be accomplished automatically with an industrial control computer and proper instrumentation. In either case, the control method is a feedback control that inherently requires a deviation from the desired final product concentration to make a change to the feed juice flow rate. The variability inherent in this type of control method can often cause the final product to be out of range from specified parameters. It should be understood that the system can use pressure or steam mass flow. Both relate to the energy fed to the evaporator.

For example, if an error is detected between the setpoint and the actual value and the change is made in one of the evaporators to the feed flow rate, which is a controlling or process variable, it may take 15 minutes before that change is made in the final concentrated juice product. This is an extended period of time that is not acceptable in all applications.

SUMMARY OF THE INVENTION

It is therefore an object of the present invention to provide a predictive model for controlling Brix in a final concentrated juice product that is discharged from a multi-stage, multi-effect evaporator, such as a TASTE evaporator.

The present is advantageous and provides a method and system of controlling the Brix of a concentrated juice product. Juice is passed through a multi-stage, multi-effect evaporator having juice and steam passing therethrough in a vacuum to form a concentrated juice product. The results of a process change in disturbance variables on the vapor temperature in at least one of the effects of the evaporator is predicted. The Brix of the concentrated juice product discharged from the evaporator is controlled based on the predicted results by controlling one of steam or juice flowing to the evaporator.

In yet another aspect of the present invention, the step of predicting the result of the disturbance variable includes the step of measuring the Brix of the juice fed into the evaporator as a disturbance variable, and measuring the pressure of juice fed into the evaporator as a disturbance variable. The pressure of steam fed into the evaporator can be controlled based on the predicted results of a change in the disturbance variables. The pressure of juice fed into the evaporator can also be changed. This step of predicting the result of changes in disturbance variables on the vapor temperature can occur in at least one of either the first or second effects of the evaporator. A steam setpoint is also established, and in one aspect of the invention, predictive models are cascaded to establish, first, a steam setpoint, and establish, second, the steam pressure into the evaporator.

In yet another aspect of the present invention, the Brix of the concentrated juice product discharged from the evaporator can be measured to form a predictive feedback model based on both the measured Brix and the process changes in the disturbance variables.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and uses real-time predictive modeling to control accurately the heating steam pressure in a TASTE evaporator. This allows full regulation of the concentrated juice Brix to a level not achievable by previous standards. A processor, such as part of a minicomputer or personal computer as a non-limiting example, acts as a predictive controller. It continuously calculates the relationships between those variables used to predict accurately the effect of disturbance variables, such as feed juice concentration and feed juice flow on the vapor temperature (used as both a process and disturbance variable) in the first or second effect of the evaporator. The heating steam pressure and consequently the steam flow can be accurately controlled using this technique. Another predictive model incorporates the final juice concentration measurement as a process variable into a feedback model that controls the feed juice flow to maintain the final juice concentration.

Figure 1:
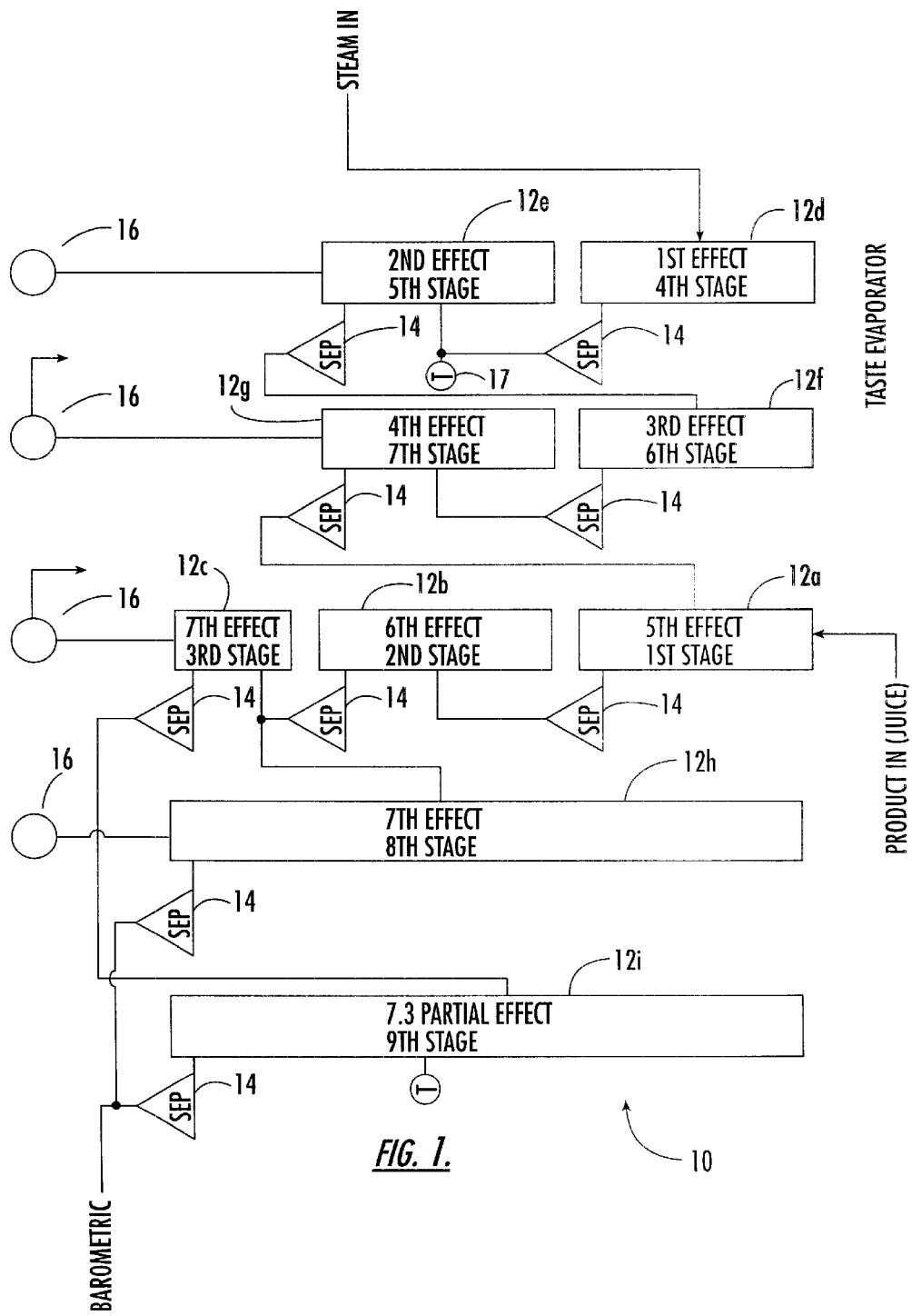
FIG. 1 is a block diagram showing a nine-stage, seven-effect TASTE evaporator that can be used in the present invention.

FIG. 1 illustrates the basic functional components of a TASTE evaporator, illustrated generally at 10, which can be used with the present invention. The evaporator is a nine-stage, seven-effect evaporator with a partial 7.3 effect acting as the ninth stage, as known to those skilled in the art. The nine stages are represented by reference numerals 12a–2i. As is well known, stages 12a–2i include separators 14, water discharges 16, and temperature sensor 17 at the first/second effects, fourth/fifth stages 12d, 12e.

It is evident that the juice product enters at the first stage 12a and the fifth effect while steam enters at the first effect and fourth stage 12d. As is known to those skilled in the art, most TASTE evaporators are operated using either forward flow or mixed flow. Any vessel where steam is flowing is an effect and the vessel where the juice flows is the stage. Although forward flow is not illustrated, the present invention is not limited to a mixed flow process. Forward flow could occur when the juice is fed to the same vessel as the steam and follows a path through different vessels and parallel to vapor flow. In a mixed flow, juice is introduced to one of the intermediate vessels as illustrated and evaporated by the vapor generated in the preceding vessel.

After partial concentration, the juice is fed to a first vessel where it is evaporated using fresh steam. Evaporation takes place in one or more stages following a feed stage and also following the first effect. Vapor always starts at the highest pressure and ends at a stage with the lowest pressure. Steam is used on a first effect and each subsequent effect is heated by vapor evaporated in the preceding stage. Vapor is primarily water, but also contains volatile materials that were originally contained in the juice and can be recovered by removing part of the vapors from the heating side of the evaporation effect. Although the nine-stage TASTE evaporator is shown and described as a non-limiting example, the present invention can be used with different multi-stage, multi-effect evaporators, as known to those skilled in the art.

A TASTE evaporator can provide during a preheating cycle a first evaporation stage for the pasteurization and stabilization of juice. In a tube nest, juice can be introduced as a turbulent fog and the heat transfer rate can be several times higher than could be expected under many conditions. Acceleration permits a speed of approximately 638 or more feet per second (7 Km/hour) per hour into the tubes. This type of TASTE evaporator eliminates recycling of juice during concentration and minimizes the length of time at which the heat treatment is applied to the juice resulting in a better quality juice.

The system can use simplified controls and special transfer pumps to provide adequate flexibility for an entire evaporating cycle. As an example, in a seven effect evaporator, an evaporation rate of about 5.7 Kg./12.6 pounds of water for each Kg./Pd. of steam can be accomplished and even higher existing evaporating rates Perk./Pd. of steam is possible. Fruit juice and other vegetable can be evaporated and permits up to 65/75 Brix in a cycle time of about two minutes, 30 seconds approximately, and can operate at 50% of nominal capacity without problems. An example of a TASTE evaporator used for the present invention produced by FMC Food Tech, Florida.

The TASTE evaporator system can include an Essence Recovery System and a Cleaning in Place System to provide high sanitation and cleaning in 35–45 minutes. The Essence Recovery System recovers that essence contained in vapors taken from several stages before condensation in a barometric column. The cooling effect is partially given by a cold juice taken from a first preheater and ammonia or Freon 22 in a separate refrigeration system, as known to those skilled in the art. The aroma would be collected in a decant tank in which the water waste phase is separated from the oil phase.

Basic calculations as known to those skilled in the art are used for calculating the input of juice and the concentrate. These basic calculations include:

w=water evaporated per hour

Q=quantity of input juice per hour

C=quantity of concentrate obtained at the desired concentration

M=initial concentration (% of soluble solids or Brix in the original juice)

n=final concentration (in % of soluble solids or Brix)

Examples

To calculate water evaporated: W=Q(1−m/n)

To calculate concentrate obtained: C=Q−W

To calculate input of juice: Q=C+W

Figure 2:
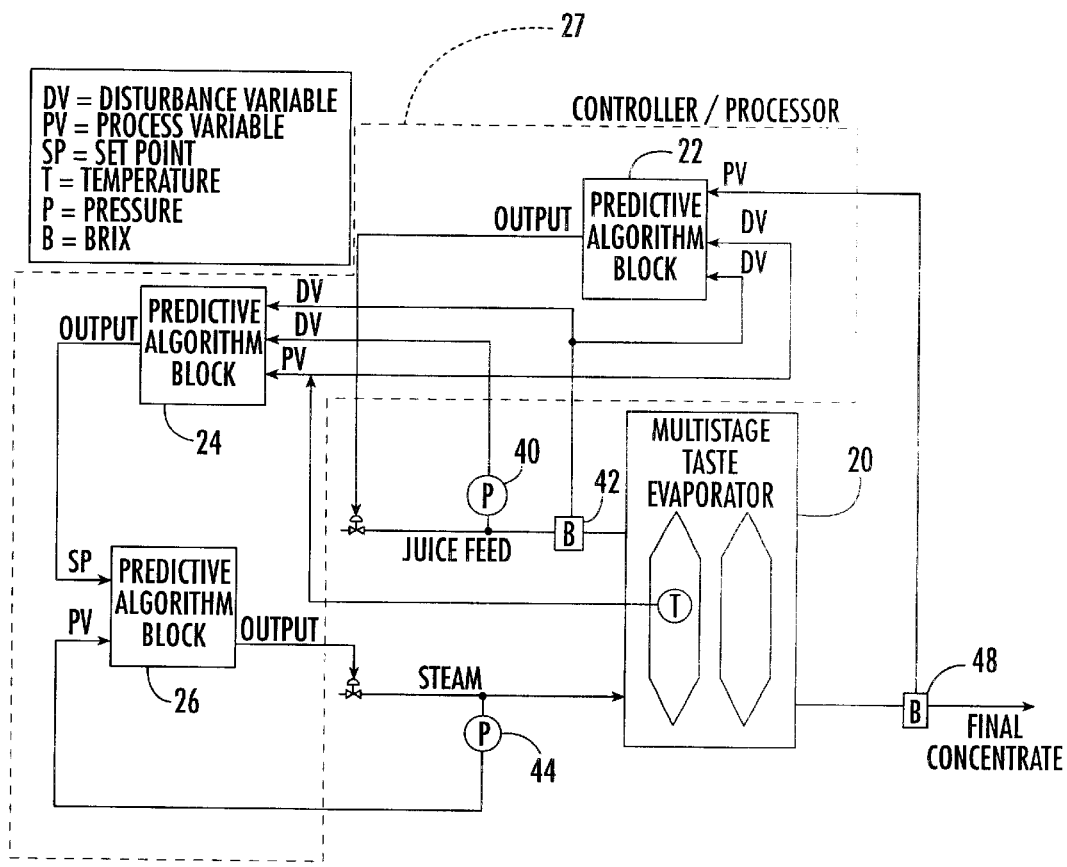
FIG. 2 is a block diagram showing the predictive control of a TASTE evaporator and predictive algorithm blocks.

FIG. 2 illustrates a basic block diagram of the adaptive predictive control for a TASTE evaporator showing a multi-stage TASTE evaporator at block 20 and three predictive algorithm blocks, i.e., software components 22, 24, 26 of a controller/processor 27, such as part of a mini or personal computer, and the various disturbance and process variables. As known to those skilled in the art, the disturbance variables correspond to those variables of process that have an affect on the process control. The process variables are those variables that control the system, such as the Brix measurement of the final juice concentrate. This Brix measurement is part of the predictive algorithm input. The temperature of the steam from the multi-stage, multi-effect evaporator is used in a cascaded predictive algorithm as shown by the predictive algorithm blocks 24 and 26. Disturbance variables include the Brix of the juice feed and its pressure. The pressure of the steam is a process variable as well as the temperature within the evaporator. These disturbance variables are determined by the pressure sensor 40 for the juice feed and the Brix measurement device 42 for the juice feed. The pressure sensor 44 for steam, temperature sensor 46 for the evaporator and final Brix measurement 48 provide the process variables.

Although basic statistical analysis software can be used in the present invention, predictive modeling using linear regression analysis is advantageously used and measures the relationship among the variables, and thus, regulates a temperature control loop by examining the change in the Brix of the input feed, the final concentrate, and the pressure of the juice feed and steam.

As is known to those skilled in the art, linear regression is a statistical tool that predicts future values from past values. The relationship between two variables, x and y, can be represented by a simple linear equation of the form:

$$y = b_0 + b_1 x + 3$$

where y is the response or dependent variable and x is the regressor or independent variable. The error term, e, indicates that there is no perfect relationship. It is possible to predict y for a given x by estimating the coefficients or parameters $b_0$ and $b_1$. Data relating to a TASTE evaporator is collected where y and x are observed directly and the data indicates appropriate values for coefficients. This data concerns various disturbance variables and process variables. It is possible to estimate the coefficients or parameters by a least squares methodology to choose estimates by statistical techniques and algorithms, as known to those skilled in the art. Statistics could be calculated to indicate how well a given least squares regression line fits data. A consideration of the sum of squares decomposition is possible where the total variation in y about its own average can be broken into a component of explained (by a regression line) and unexplained residual variation.

As shown in FIG. 2, the final concentrate Brix is used as a process variable for the first predictive algorithm block 22 that receives as disturbance variables the pressure of the juice feed and the Brix of the juice feed. It is shown that the temperature of the steam in the evaporator is used as a process variable for the predictive algorithm block 24 that is cascaded to control steam, but used as a disturbance variable in the first predictive algorithm block 22 that controls juice feed. The output of the predictive algorithm block 24 establishes the setpoint for the steam. This setpoint is used to predict the steam flow and an output signal is sent to a controller, such as a software component of the processor, for controlling the steam flow into the evaporator. The predictive algorithm blocks are part of an overall process controller that could be part of a personal computer having appropriate software.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of controlling the Brix of a concentrated juice product comprising the steps of:

passing juice through a multi-stage, multi-effect evaporator having juice and steam passing therethrough under vacuum to form a concentrated juice product;

predicting the results of a process change in disturbance variables on the vapor temperature in at least one of the effects of the evaporator; and controlling the Brix of the concentrated juice product discharged from the evaporator based on the predicted results by controlling one of steam or juice flow into the evaporator.

2. A method according to claim 1, wherein the step of predicting the result of the disturbance variables includes the step of measuring the Brix of the juice fed into the evaporator as a disturbance variable.

3. A method according to claim 1, wherein the step of predicting the result of the disturbance variables includes the step of measuring the pressure of juice fed into the evaporator as a disturbance variable.

4. A method according to claim 1, and further comprising the step of controlling the pressure of steam fed into the evaporator based on the predicted results of a change in the disturbance variables.

5. A method according to claim 1, and further comprising the step of controlling the pressure of juice fed into the evaporator based on the predicted results of a change in the disturbance variables.

6. A method according to claim 1, and further comprising the step of predicting the result of disturbance variables on the vapor temperature in at least one of either the first or second effects of the evaporator.

7. A method according to claim 1, wherein the step of predicting the result of disturbance variables further comprises the step of establishing a steam setpoint.

8. A method according to claim 1, and further comprising the step of applying a cascading predictive model for predictions to establish first a steam setpoint and establish second the steam pressure into the evaporator.

9. A method of controlling the Brix of a concentrated juice product comprising the steps of:

passing juice through a multi-stage, multi-effect evaporator having juice and steam passing therethrough under vacuum to form a concentrated juice product;

predicting the results of a process change in disturbance variables on the vapor temperature in at least one of the effects of the evaporator;

measuring the Brix of the concentrated juice product discharged from the evaporator and forming a predictive feedback model based on the measured Brix and the process change in disturbance variables; and controlling the Brix of the concentrated juice product discharged from the evaporator based on the predicted results of a process change in disturbance variables and the predictive feedback model by controlling one of steam or juice flow into the evaporator.

10. A method according to claim 9, wherein the step of predicting the result of the disturbance variables includes the step of measuring the Brix of the juice fed into the evaporator as a disturbance variable.

11. A method according to claim 9, wherein the step of predicting the result of the disturbance variables includes the step of measuring the pressure of juice fed into the evaporator as a disturbance variable.

12. A method according to claim 9, and further comprising the step of controlling the pressure of steam fed into the evaporator based on the predicted results of a change in the disturbance variables.

13. A method according to claim 9, and further comprising the step of controlling the pressure of juice fed into the evaporator based on the predicted results of a change in the disturbance variables.

14. A method according to claim 9, and further comprising the step of predicting the result of disturbance variables on the vapor temperature in at least one of either the first or second effects of the evaporator.

15. A method according to claim 9, wherein the step of predicting the result of disturbance variables further comprises the step of establishing a steam setpoint.

16. A method according to claim 9, and further comprising the step of applying a cascading predictive model for predictions to establish first a steam setpoint and establish second the steam pressure.

* * * * *

UNITED STATES PATENT AND TRADEMARK OFFICE
CERTIFICATE OF CORRECTION

PATENT NO.   : 6,497,912 B2
DATED        : December 24, 2002
INVENTOR(S)  : Milla et al.

It is certified that error appears in the above-identified patent and that said Letters Patent is hereby corrected as shown below:

Column 5,
Line 3, delete "$y = b_0 + b_1 x + 3$" substitute -- $y = b_0 + b_1 x + e$ --

Signed and Sealed this

Twenty-second Day of April, 2003

JAMES E. ROGAN
*Director of the United States Patent and Trademark Office*